United States Patent
Calamari et al.

[19]

[11] Patent Number: 6,128,861
[45] Date of Patent: Oct. 10, 2000

[54] DOOR FRAME ASSEMBLY

[75] Inventors: Michael A. Calamari, Nuneaton, United Kingdom; Alan A. Davidovich, Garner, N.C.

[73] Assignee: Caterpillar Inc., Peoria, Ill.

[21] Appl. No.: 08/560,395

[22] Filed: Nov. 17, 1995

[51] Int. Cl.[7] .................................................. E06B 3/00
[52] U.S. Cl. ........................................... 49/501; 49/490.1
[58] Field of Search .................................. 49/501, 490.1; 52/780, 781, 785.1, 204.62, 204.591, 800.11

[56] References Cited

U.S. PATENT DOCUMENTS

| | | | |
|---|---|---|---|
| 4,554,764 | 11/1985 | Jenkins | 49/490.1 X |
| 4,765,677 | 8/1988 | Nagata | 49/490.1 X |
| 4,822,098 | 4/1989 | Vogt et al. | 296/901 |
| 4,837,977 | 6/1989 | Mauro | 49/501 |
| 4,957,324 | 9/1990 | Doescher et al. | 296/190 |
| 4,986,593 | 1/1991 | Lohmann | 296/190 |
| 4,994,311 | 2/1991 | Junker | 49/490.1 X |
| 5,007,201 | 4/1991 | D'Hoore et al. | 49/348 |
| 5,012,616 | 5/1991 | Martin | 49/501 |
| 5,125,716 | 6/1992 | Smith et al. | 296/190 |

FOREIGN PATENT DOCUMENTS

| | | |
|---|---|---|
| 0608422 | 8/1994 | European Pat. Off. . |
| 2492939 | 4/1982 | France . |
| 86 17 521 | 9/1986 | Germany . |

*Primary Examiner*—Joanne Silbermann
*Assistant Examiner*—Curtis Cohen
*Attorney, Agent, or Firm*—Claude F. White; Diana L. Charlton

[57] ABSTRACT

A door frame assembly for a work machine includes a plurality of rectangular tubes, a plurality of zee shaped metal strips, and a plurality of resilient seals. The tubes are joined together to form a rectangular framework. Each metal strip is connected to one of the tubes and one of the seals is connected to a first leg portion of each of the strips. Each of the tubes and a second leg portion of each of the strips define a recess and a glass panel is adapted to rest within the recess and be bonded to the second leg portions. The door frame assembly is economical to manufacture and requires no expensive or complex forming tools.

9 Claims, 3 Drawing Sheets

DOOR FRAME ASSEMBLY

TECHNICAL FIELD

This invention relates generally to a door frame assembly for a work machine and more particularly to such a frame assembly which is simple and economical to manufacture and assemble.

BACKGROUND ART

Access door assemblies for earthmoving and construction machines are comprised of a plurality of structures, including glass panes, frame members, seals, and other components. The glass panes and seals must be connected in some manner to the frame members. A plurality of clips, fasteners, and retainers are generally required to connect and assemble the plurality of components. Such door assemblies are, therefore, expensive and time consuming to manufacture.

The present invention is directed to overcoming one or more of the problems as set forth above.

DISCLOSURE OF THE INVENTION

In one aspect of the present invention, a door frame assembly includes a plurality of rectangular metal tubes, a plurality of zee shaped metal strips, and a plurality of elongated resilient seals. The metal tubes are connected together to form a rectangular framework and one of the metal strips is connected to each of the metal tubes. Each elongated seal has a compressible portion and a gripping portion, with the gripping portion adapted to grip a portion of each zee shaped metal strip.

Door frame assemblies for work machines must provide a good seal between the door assembly and the machine frame. Additionally, the door assembly must accommodate a glass pane and provide means to secure the glass pane to the door assembly. Many prior art door assemblies are complex, consisting of a plurality of components held together by many different types of clips, fasteners, and retainers. The complexity of such door assemblies adds costs and time to manufacture and assemble.

The subject door frame assembly is comprised of a minimum of components and is simple and easy to manufacture and assemble.

BEST MODE FOR CARRYING OUT THE INVENTION

Figure 1:
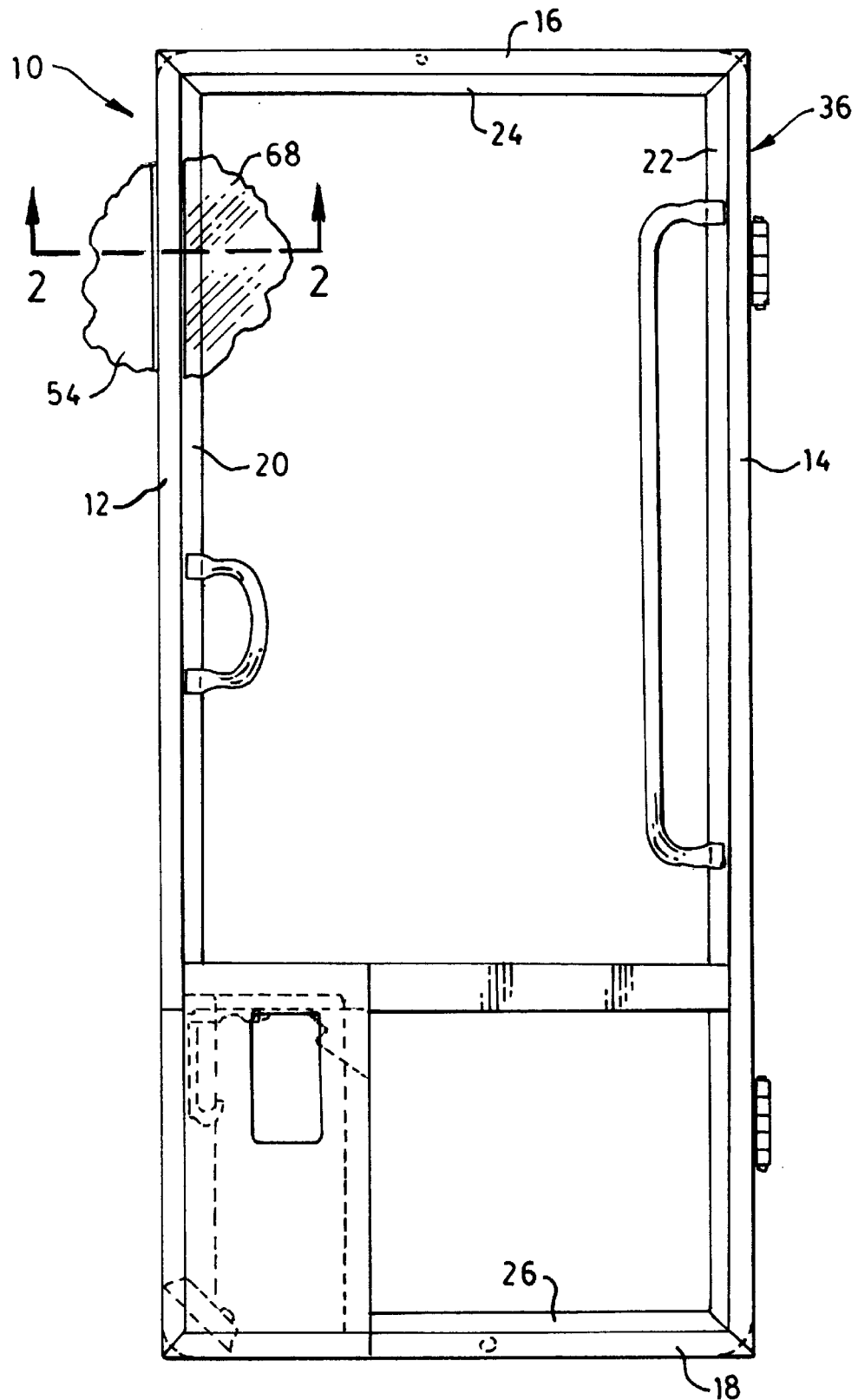
FIG. 1 is a diagrammatic front elevational view of a door frame assembly of the subject invention; and FIG. 2
Figure 2:
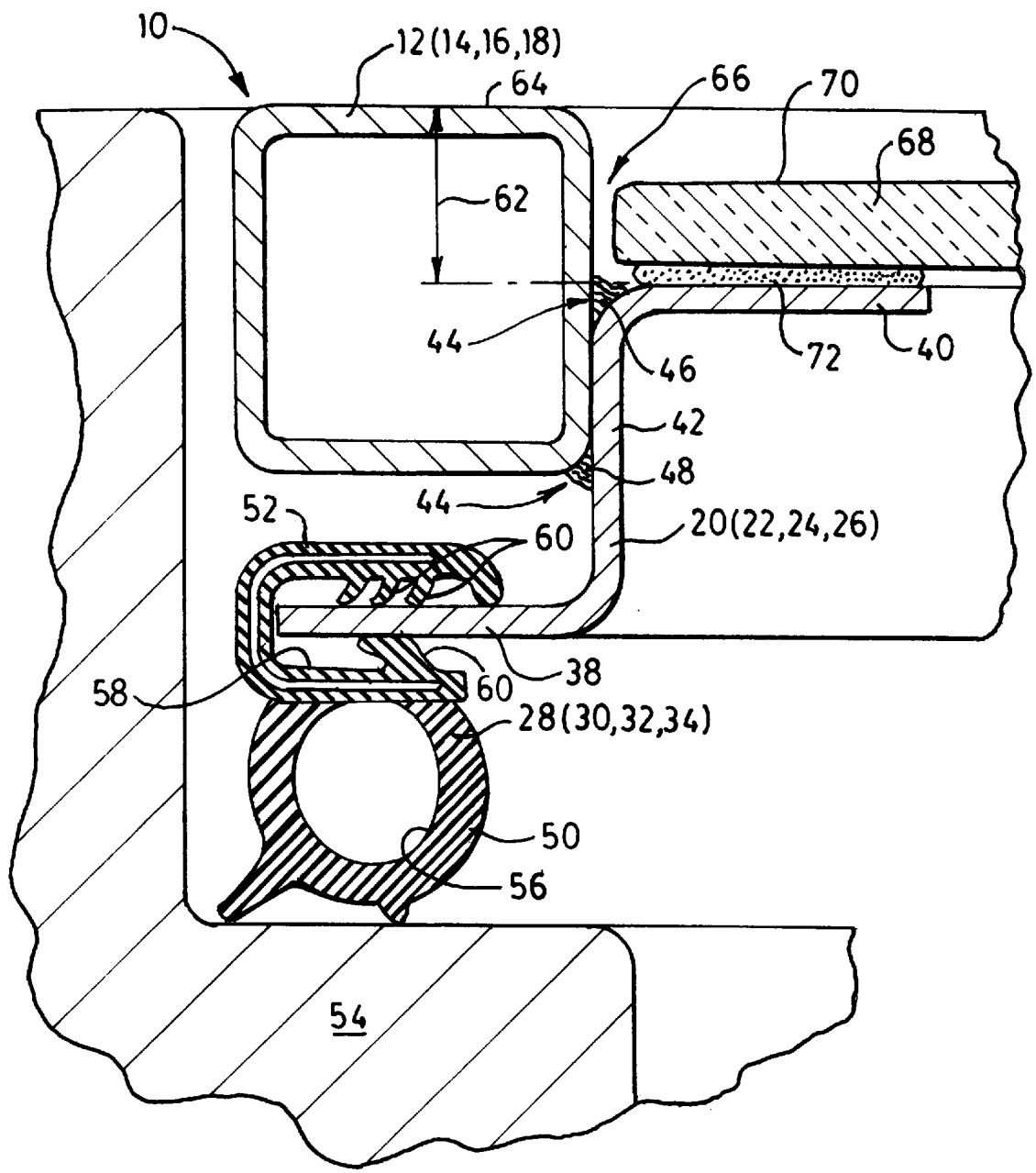
Figure 3:
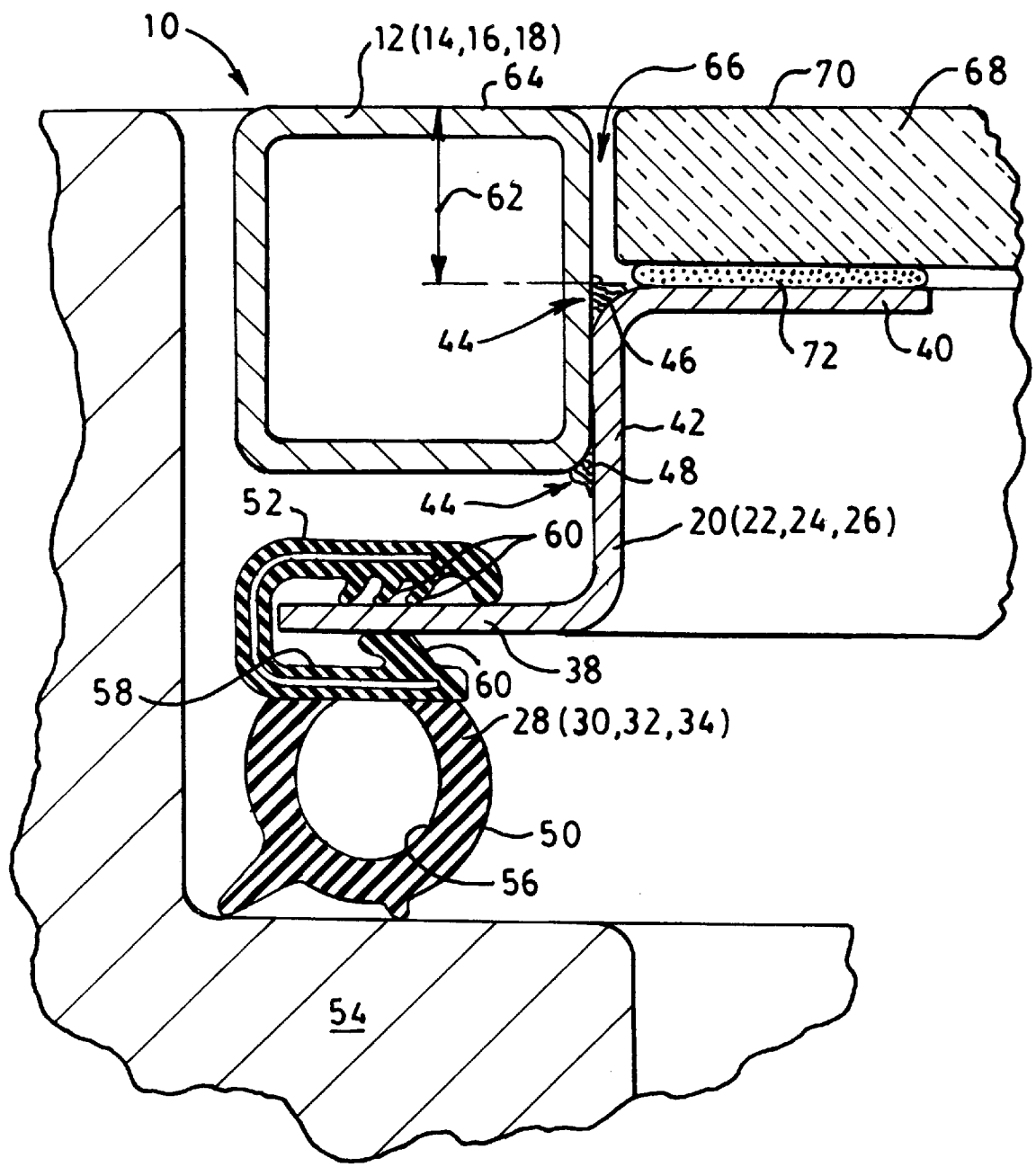
FIG. 3 is an enlarged diagrammatic sectional view taken generally along the lines 2—2 of FIG. 1.

With reference to the drawings, a door frame assembly 10 for a work machine (not shown) includes a plurality of elongated metal tubes 12,14,16,18, a plurality of metal strips 20,22,24,26, and a plurality of elongated resilient seals 28,30,32,34. Each of the tubes 12,14,16,18 has a rectangular shape in cross-section and the plurality of tubes 12,14,16,18 are connected together to form a rectangular framework 36. Each of the metal strips 20,22,24,26 is substantially zee shaped in cross-section and includes first and second leg portions 38,40 and a connecting central body portion 42. A connecting means 44, such as fillet welds 46,48, connects the central body portion 42 of each metal zee strip 20,22,24,26 to one of the metal tubes 12,14,16,18. The connecting means 44 can also include plug welding between the metal zee strips 20,22,24,26 and the metal tubes 12,14,16,18.

Each of the resilient seals 28,30,32,34 has a compressible portion 50 and a gripping portion 52. The gripping portion 52 is adapted to envelop and grip the first leg portion 38 of each zee strip 20,22,24,26. The compressible portion 50 is adapted to contact a frame portion 54 of the work machine and form a sealed surface therebetween. The compressible portion 50 includes a first hollow cavity 56 which allows the compressible portion 50 to deform as the door frame assembly 10 is closed against the frame portion 54. The gripping portion 52 includes a second cavity 58 and a plurality of resilient fingers 60 located within the cavity 58. The first leg portion 38 of each metal zee strip 20,22,24,26 is adapted to be positioned within the second cavity 58 with the fingers 60 being adapted to contact and grip the first leg portion 38.

The central body portion 42 of each zee strip 20,22,24,26 is connected to one of the tubes 12,14,16,18 at a spaced distance 62 from a first planar surface 64 of the tubes 12,14,16,18, to define a recess 66. A glass panel 68, having a second planar surface 70, is adapted to rest in the recess 66 and be supported by the second leg portion 40 of each zee strip 20,22,24,26. An adhesive 72 is positioned between the glass panel 68 and the second leg portions 40 for bonding of the glass panel 68 to the second leg portion 40. The first planar surface 64 and the second planar surface 70 are substantially flush or coplanar, which protects the glass panel 68. The second planar surface 70 can also be lower than the first planar surface 64.

INDUSTRIAL APPLICABILITY

With reference to the drawings and the previous detailed description, the subject door frame assembly 10 is particularly useful as a cab door for a work machine. The frame assembly is economical to manufacture and requires no expensive or complex form tooling. The main support members of the frame assembly 10 include the plurality of rectangular metal tubes 12,14,16,18 to which the metal zee strips 20,22,24,26 are connected by plug or fillet welds. The resilient seals 28,30,32,34 are connected to the frame assembly 10 by sliding the gripping portions 52 onto the first leg portions 38, wherein the resilient fingers 60 grip the first leg portions 38. An adhesive 72 is applied to the second leg portions 40 and the glass panel 68 is placed in the recess 66 such that the adhesive 72 bonds the glass panel 68 and the second leg portion 40 together.

Other aspects, objects and advantages of this invention can be obtained from a study of the drawings, the disclosure, and the appended claims.

What is claimed is:

1. A door frame assembly, comprising:
   a plurality of elongated metal tubes, each tube having a rectangular shape in cross-section, said tubes being connected together to form a rectangular framework;
   a plurality of elongated metal strips, each strip having a zee shape in cross section and including first and second leg portions and a connecting central body portion;
   a plurality of elongated resilient seals, each seal having a compressible portion and a gripping portion, said gripping portion enveloping and gripping said first leg portion of each zee strip; and
   means for connecting said central body portion of each metal zee strip to one of said metal tubes.

2. A door frame assembly, as set forth in claim 1, wherein said connecting means includes plug welding said metal zee strip to said metal tube.

3. A door frame assembly, as set forth in claim 1, wherein said connecting means includes fillet welding of said metal zee strip to said metal tube.

4. A door frame assembly, as set forth in claim 1, including a glass panel, said second leg portion of each metal zee strip supporting said glass panel.

5. A door frame assembly, as set forth in claim 1, wherein said central body portion of said metal zee strip is connected to said metal tube to define a recess, and a glass panel rests in said recess and is supported by said second leg portion.

6. A door frame assembly, as set forth in claim 5, including an adhesive positioned between said second leg portion and said glass panel for bonding said glass panel to said second leg portion.

7. A door frame assembly, as set forth in claim 5, wherein each of said metal tubes has a first planar surface and said glass panel has a second planar surface, said first planar surface and said second planar surface being substantially coplanar.

8. A door frame assembly, as set forth in claim 1, wherein said gripping portion includes a cavity and a plurality of resilient fingers located within said cavity, said first leg portion positioned within said cavity and said fingers contacting said first leg portion.

9. A door frame assembly, as set forth in claim 5, wherein each of said metal tubes has a first planar surface and said glass panel has a second planar surface, said second planar surface being spaced from said first planar surface.

\* \* \* \* \*